(12) United States Patent
Chu et al.

(10) Patent No.: US 12,524,245 B2
(45) Date of Patent: Jan. 13, 2026

(54) STORAGE DEVICE, OPERATING METHOD OF STORAGE DEVICE, AND PROCESSOR OF STORAGE DEVICE

(71) Applicant: Samsung Electronics Co., Ltd., Suwon-si (KR)

(72) Inventors: Younsung Chu, Suwon-si (KR); Jisoo Kim, Suwon-si (KR)

(73) Assignee: Samsung Electronics Co., LTD., Gyeonggi-Do (KR)

( * ) Notice: Subject to any disclaimer, the term of this patent is extended or adjusted under 35 U.S.C. 154(b) by 109 days.

(21) Appl. No.: 18/396,430

(22) Filed: Dec. 26, 2023

(65) Prior Publication Data

US 2024/0211272 A1 Jun. 27, 2024

(30) Foreign Application Priority Data

Dec. 27, 2022 (KR) .......... 10-2022-0186380

(51) Int. Cl.
*G06F 21/00* (2013.01)
*G06F 9/4401* (2018.01)
*G06F 21/57* (2013.01)

(52) U.S. Cl.
CPC .......... *G06F 9/4403* (2013.01); *G06F 21/575* (2013.01); *G06F 2221/034* (2013.01)

(58) Field of Classification Search
CPC .............. G06F 9/4403; G06F 21/575; G06F 2221/034; G06F 21/57; G06F 21/64; G06F 21/73; G06F 21/75
See application file for complete search history.

(56) References Cited

U.S. PATENT DOCUMENTS 7,971,048 B2 6/2011 Datta et al.
9,059,855 B2 6/2015 Johnson et al.
(Continued)

OTHER PUBLICATIONS

Birnstill et al., "Introducing remote attestation and hardware-based cryptography to OPC UA", 2017 22nd IEEE International Conference on Emerging Technologies and Factory Automation (ETFA), Date of Conference: (Year: Sep. 12-15, 2017).*
(Continued)

*Primary Examiner* — Morshed Mehedi
(74) *Attorney, Agent, or Firm* — Harness, Dickey & Pierce, P.L.C.

(57) ABSTRACT

A storage device includes a device identification module configured to generate a device identifier, a bootloader configured to generate a device identification key pair based on the device identifier and perform booting of the storage device, attester firmware configured to generate a device certificate based on the device identification key pair and report security information on the device to a host, and a measurement manager configured to perform a measurement operation for the device identification module, the bootloader, and the attester firmware, store a first measurement value of the device identification module in response to determining that the first measurement value matches first information, determine whether a second measurement value of the bootloader matches second information in response to storing the first measurement, store the second measurement value in response to determining that the second measurement value matches the second information, determine whether a third measurement value of the attester firmware matches third information in response to the second measurement value being stored, store the third measurement value in response to determining that the second measurement value matches the second information, and transmit the stored first measurement value, the stores sec-
(Continued)

ond measurement value, and the stored third measurement value to the attester firmware.

20 Claims, 12 Drawing Sheets

(56) References Cited

U.S. PATENT DOCUMENTS

| | | | |
|---|---|---|---|
| 9,081,954 B2 | 7/2015 | Forristal | |
| 11,416,370 B2 | 8/2022 | Dewan et al. | |
| 11,445,027 B2* | 9/2022 | Ponnuru | G06F 8/65 |
| 2013/0318343 A1* | 11/2013 | Bjarnason | H04L 41/0809 |
| | | | 713/157 |
| 2017/0337380 A1* | 11/2017 | Domke | H04L 9/3242 |
| 2021/0336930 A1* | 10/2021 | Vessels | H04W 76/15 |
| 2022/0198018 A1* | 6/2022 | Wentz | H04L 9/3268 |
| 2022/0237295 A1 | 7/2022 | Hu et al. | |
| 2022/0292203 A1* | 9/2022 | Severns-Williams | G06F 21/57 |

OTHER PUBLICATIONS

'Hardware Requirements for a Device Identifier Composition Engine', Family "2.0", Level 00 Revision 78, Device Identifier Composition Engine, TCG Published, 2018, pp. 1-8.
'DICE Layering Architecture' Version 1.0, Revision 0.19, Trusted Computing Group, 2020, pp. 1-29.
'DICE Endorsement Architecture for Devices', Version 1.0, Revision 0.38, Trusted Computing Group, 2022, pp. 1-73.
'TCG DICE Concise Evidence Binding for SPDM', Trusted Computing Group, Version 1.00, Revision 0.53, 2023, pp. 1-50.
'Security Protocol and Data Model (SPDM) Specification', Document Identifier: DSP0274, Version 1.2.1, 2022, pp. 1-191.

* cited by examiner

STORAGE DEVICE, OPERATING METHOD OF STORAGE DEVICE, AND PROCESSOR OF STORAGE DEVICE

CROSS-REFERENCE TO RELATED APPLICATION

This application is based on and claims priority under 35 U.S.C. § 119 to Korean Patent Application No. 10-2022-0186380, filed on Dec. 27, 2022, in the Korean Intellectual Property Office, the disclosure of which is incorporated by reference herein in its entirety.

BACKGROUND

The inventive concepts relate to a storage device, an operating method of the storage device, and a processor of the storage device, and more particularly, to a storage device that performs secure booting through a separately provided configuration.

In the known method of determining whether a device configuration is tampered with during a booting process of a device, such as a solid state drive (SSD) device, a host indirectly determines whether the device configuration is tampered with according to whether booting of the device is successful after the booting is completed.

In the known method, whether a bootloader or firmware is tampered with is not directly reported to a host, and accordingly, there is a problem in that, when booting fails, why the booting failed may not be determined.

SUMMARY

The inventive concepts provide a storage device that may report to a host which configuration causes booting failure when an error occurs during booting of the storage device by performing a measurement operation for configurations of the storage device In addition, the inventive concepts provide a storage device that may report measurement values of components of the storage device to a host.

According to some example embodiments of the inventive concepts, a storage device includes a device identification module configured to generate a device identifier, a bootloader configured to generate a device identification key pair based on the device identifier and perform booting of the storage device, attester firmware configured to generate a device certificate based on the device identification key pair and report security information on the device to a host, and a measurement manager configured to perform a measurement operation for the device identification module, the bootloader, and the attester firmware, store a first measurement value of the device identification module in response to determining that the first measurement value matches first information, determine whether a second measurement value of the bootloader matches second information in response to storing the first measurement, store the second measurement value in response to determining that the second measurement value matches the second information, determine whether a third measurement value of the attester firmware matches third information in response to the second measurement value being stored, store the third measurement value in response to determining that the second measurement value matches the second information, and transmit the stored first measurement value, the stores second measurement value, and the stored third measurement value to the attester firmware.

According to some example embodiments of the inventive concepts, an operating method of a storage device includes performing measurement of a plurality of components according to a request from a host for a measurement operation for the plurality of components of the storage device, performing secure booting based on a result of the measurement of the plurality of components, storing a first measurement value of a device identification module in a first register in response to determining that the first measurement value matches first information, determining whether a second measurement value of a bootloader matches second information in response to the first measurement value being stored, storing the second measurement value in a second register in response to determining that the second measurement value matches the second information, determining whether a third measurement value of attester firmware matches third information in response to the second measurement value being stored, storing the third measurement value in a third register in response to determining that the third measurement value matches the third information, transmitting the first information, the second information, and the third information to an attester firmware, and reporting the first information, the second information, and the third information to the host.

According to some example embodiments of the inventive concepts, a processor of a storage device configured a request for a measurement operation for a plurality of components of the storage device from a host and perform the measurement operation for the plurality of components includes a first register, a second register, and a third register, the processor configured to store a first measurement value of a device identification module in the first register in response to determining that the first measurement value matches first information, determine whether a second measurement value of a bootloader matches second information in response to the first measurement value being stored, store the second measurement value in the second register in response to determining that the second measurement value matches the second information, determine whether a third measurement value of attester firmware matches third information in response to the second measurement value being stored, store the third measurement value in the third register in response to determining that the third measurement value matches the third information, and transmit the first information, the second information, and the third information to the attester firmware.

BRIEF DESCRIPTION OF THE DRAWINGS

Some example embodiments will be more clearly understood from the following detailed description taken in conjunction with the accompanying drawings in which.

DETAILED DESCRIPTION

Terms used herein will be briefly described, and some example embodiments will be described in detail.

Figure 1:
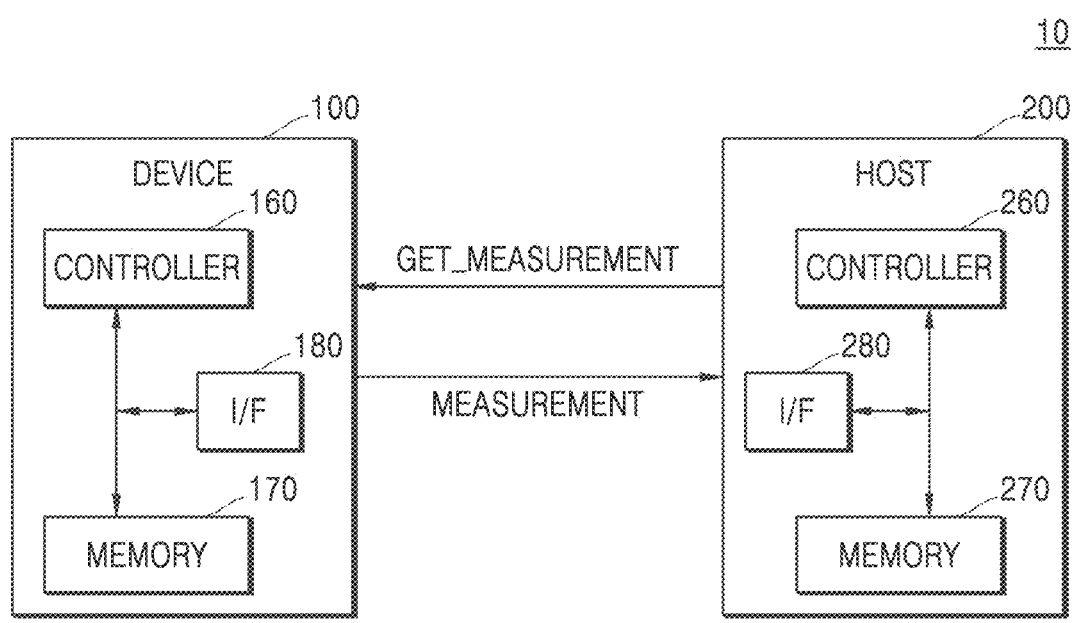
FIG. 1 is a block diagram of a memory system according to some example embodiments.

FIG. 1 is a block diagram of a memory system 10 according to some example embodiments.

Referring to FIG. 1, a memory system 10 according to some example embodiments may include a device 100 and a host 200.

The device 100 may include a controller 160, a memory 170, and/or an interface 180.

The device 100 according to some example embodiments may receive a measurement value generation request signal GET_Measurement from the host 200 and generate a plurality of measurement value responses Measurement. For example, the device 100 may generate measurement value responses Measurement of a bootloader, attester firmware (attester FW), and a plurality of pieces of firmware. For example, the memory device 100 may receive the measurement value request signal GET_Measurement and transmit the plurality of measurement values via the interface 180.

The device 100 according to some example embodiments may be a storage device according to the inventive concepts. The device 100 used herein may refer to a storage device. For example, the device 100 may include a solid state driver (SSD) or a universal flash storage (UFS). The memory 170 may include a plurality of memory cells, for example, the plurality of memory cells may be flash memory cells. For example, the memory device may include a volatile memory device, such as dynamic random access memory (DRAM) or static random access memory (SRAM), or a nonvolatile memory device, such as electrically erasable programmable read-only memory (EEPROM), ferroelectric RAM (FRAM), Phase-change RAM (PRAM), magneto-resistive RAM (MRAM), or flash memory.

The host 200 may include a controller 260, a memory 270, and/or an interface 280. The memory 270 may function as a buffer memory for temporarily storing data to be transmitted to the device 100 or data transmitted therefrom. The controller 260 may be any one of modules included in an application processor, and the application processor may be realized as a System on Chip (SoC). Also, the memory 270 may be an embedded memory included in the application processor, or a non-volatile memory or a memory module outside the application processor. The interface 280 may send and/or receive data between the host 200 and the device 100. For example, the interface may send a measurement value request signal GET_Measurement.

The host 200 according to some example embodiments may transmit signals for performing an authentication operation of a memory device to the device 100. For example, the host 200 may transmit the measurement value generation request signal GET_Measurement to the device 100 to determine whether components included in the device 100 are tampered with, and may receive a measurement value response Measurement of the bootloader, the attester FW, and/or the plurality of pieces of firmware. The host 200 according to some example embodiments may perform an authentication operation for components of the device 100. For example, the host 200 may receive the measurement values of a device identification module, the bootloader, the attester FW, and/or the plurality of pieces of firmware, and may determine whether the device identification module, the bootloader, the attester FW, and/or the plurality of pieces of firmware are tampered with based on the received measurement values. In determining whether components of the device 100 are tampered with, the host 200 according to some example embodiments may directly receive a measurement values response Measurement and perform secure booting.

The host 200 according to some example embodiments compares a preset (or alternately given) measurement value of a device identification module with a first measurement value, and when it is determined that the preset (or alternately given) measurement value of the device identification module is different from the first measurement value as a result of the comparison, the device identification module may be determined to be tampered with. The preset (or alternately given) measurement value of the device identification module according to some example embodiments may be input by a manufacturer of the device 100. The first measurement value according to some example embodiments may be a measurement value of the device identification module.

The host 200 according to some example embodiments may compare a preset (or alternately given) measurement value of the bootloader with a second measurement value, and when it is determined that the preset (or alternately given) measurement value of the bootloader is different from the second measurement value as a result of comparison, the bootloader may be determined to be tampered with. The preset (or alternately given) measurement value of the bootloader according to some example embodiments may be input by a manufacturer of the device 100. The second measurement value according to some example embodiments may be a measurement value of the bootloader.

The host 200 according to some example embodiments may compare a preset (or alternately given) measurement value of the attester FW with a third measurement value, and when it is determined that the preset (or alternately given) measurement value of the attester FW is different from the third measurement value as a result of the comparison, the attester FW may be determined to be tampered with. The preset (or alternately given) measurement value of the attester FW according to some example embodiments may be input by a manufacturer of the device 100. The third measurement value according to some example embodiments may be a measurement value of the attester FW.

The host 200 according to some example embodiments may compare preset (or alternately given) measurement values of a plurality of pieces of firmware with measurement values of a plurality of pieces of firmware received from the attester FW, and as a result of the comparison, when it is determined that the preset (or alternately given) measurement values of the plurality of pieces of firmware are different from the measurement values of the plurality of pieces of firmware received from the attester FW, at least one of the plurality of pieces of firmware may be determined to be tampered with. According to some example embodiments, the preset (or alternately given) measurement values of the plurality of pieces of firmware may be input by a manufacturer of the device 100.

Therefore, according to example embodiments, the host 200 may determine whether the device 100 is falsified based on measurement values transmitted by the device 100. For example, the host 200 may determine whether the bootloader 120 and/or the attester firmware 130 is falsified. Accordingly, the host 200 may know whether the device 100 is determined to be falsified. The host 200 may therefore know why a booting of the device 100 fails. Therefore, the system 10, according to example embodiments, may be able to more accurately diagnose and repair boot problems of a storage device.

Figure 2:
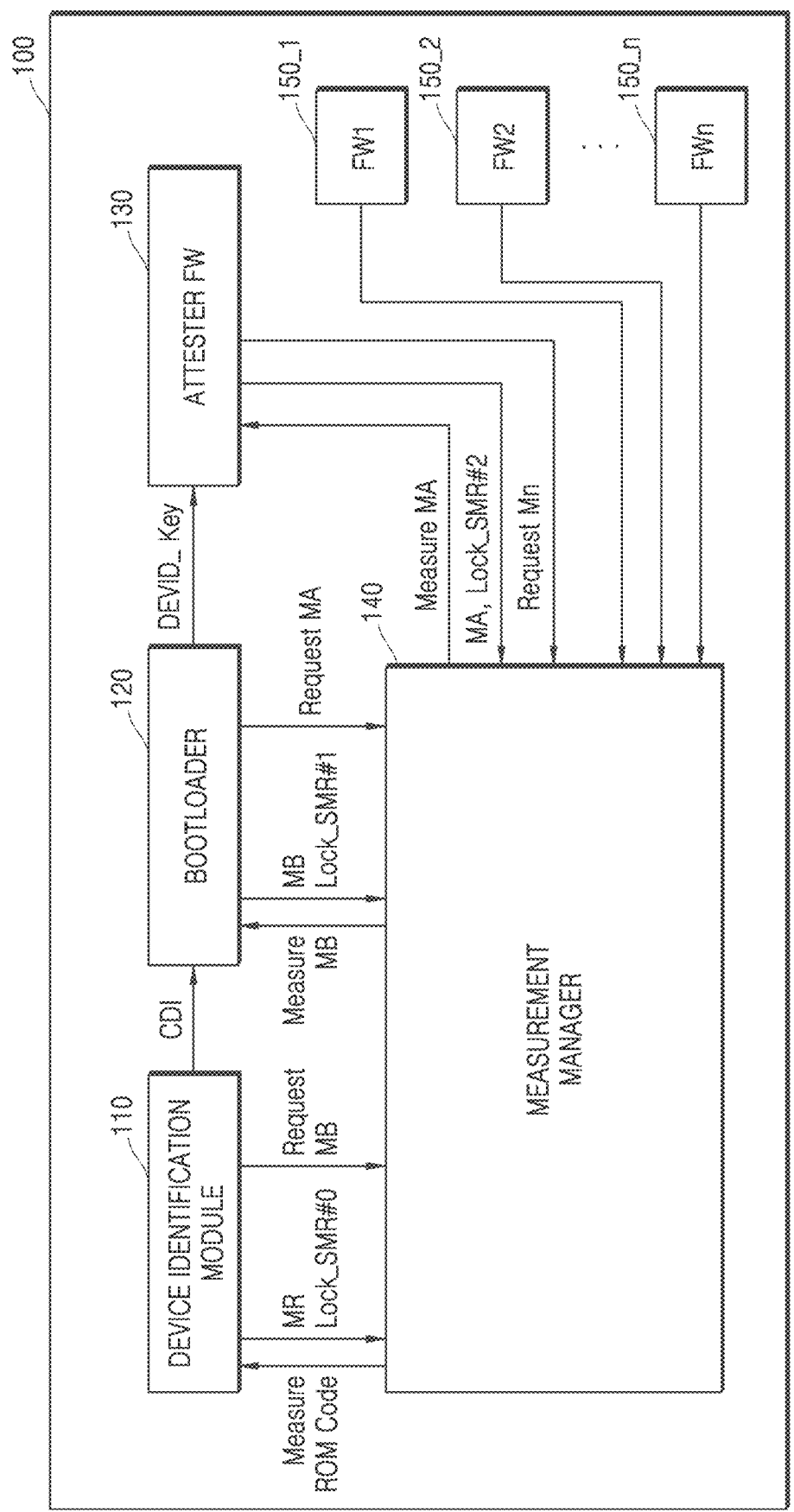
FIG. 2 is a block diagram of a storage device according to some example embodiments.

FIG. 2 is a block diagram of a storage device 100 according to some example embodiments.

Referring to FIG. 2, the storage device 100 according to some example embodiments may include a device identification module 110, a bootloader 120, attester FW 130, and a measurement manager 140. In addition, the storage device 100 according to some example embodiments may include a plurality of pieces of firmware 150_1, 150_2, . . . , 150_$n$. The device identification module 110, the bootloader 120, the attester FW 130, the measurement manager 140, and/or the plurality of pieces of firmware 150_1, 150_2, . . . , 150_$n$ may be implemented by the controller 160. However, example embodiments are not limited thereto.

The device identification module 110 according to some example embodiments may measure a preset (or alternately given) ROM code and generate a device identifier CDI. A first measurement value MR according to some example embodiments may be a ROM code of the device identification module 110.

For example, in order to perform secure booting, the device identification module 110 may receive a request for measuring a ROM code Measure ROM Code and measure the ROM code. The device identification module 110 according to some example embodiments may transmit the measured ROM code to the measurement manager 140 as the first measurement value MR. In addition, the device identification module 110 according to some example embodiments requests the measurement manager 140 to store the first measurement value MR, and when the first measurement value MR is stored, the device identification module 110 may receive a write prohibition request Lock_SMR #0 to a first register SMR #0. For example, the first measurement value MR may be stored in the first register SMR #0. When the first measurement value MR is stored and writing to the first register SMR #0 is prohibited, the device identification module 110 according to some example embodiments may transmit a signal Request MB for requesting a measurement value of the bootloader 120 to the measurement manager 140. When a measurement operation of the device identification module 110 according to some example embodiments is completed, the device identification module 110 may generate the device identifier CDI and transmit the generated device identifier CDI to the bootloader 120.

The bootloader 120 according to some example embodiments may generate a device identification key pair based on the device identifier CDI and boot the device 100.

For example, in order to perform secure booting, the bootloader 120 may receive a measurement request Measure MB for a bootloader and measure a measurement value of the bootloader 120. The bootloader 120 according to some example embodiments may transmit the measured value to the measurement manager 140 as a second measurement value MB. In addition, the bootloader 120 according to some example embodiments the bootloader requests the measurement manager 140 to store the second measurement value MB, and when the second measurement value MB is stored, the bootloader 120 may request a write prohibition request Lock_SMR #1 to a second register SMR #1. For example, the second measurement value MB may be stored in the second register SMR #1. When the second measurement value MB is stored and writing to the second register SMR #1 is prohibited, the bootloader 120 according to some example embodiments may transmit a signal Request MA for requesting a measurement value of the attester FW 130 to the measurement manager 140. When a measurement operation of the bootloader 120 is completed, the bootloader 120 according to some example embodiments may generate the device identification key pair, and transmit the generated device identification key pair to the attester FW 130.

The attester FW 130 according to some example embodiments may generate a device certificate based on the device identification key pair and report security information on the device 100 to the host 200. A measurement value of the attester FW 130 according to some example embodiments may be referred to as a third measurement value MA.

When a measurement request Measure MA for the attester FW 130 is received, the attester FW 130 according to some example embodiments may perform a measurement operation for the attester FW 130 and transmit the third measurement value MA to the measurement manager 140. The third measurement value MA according to some example embodiments may be stored in a third register SMR #2 of the measurement manager 140. When the third measurement value MA is stored in the third register SMR #2, the attester FW 130 according to some example embodiments may transfer a write prohibition request Lock_SMR #2 to the third register SMR #2 to the measurement manager 140. When storing of the third measurement value MA is completed and writing to the third register SMR #2 is prohibited, the attester FW 130 according to some example embodiments may transmit a signal Request Mn for requesting a measurement operation for the plurality of pieces of firmware 150_1, 150_2, . . . , 150_$n$ to the measurement manager 140.

The attester FW 130 according to some example embodiments may transmit security information to the host 200. The security information according to some example embodiments may include the first measurement value MR of the device identification module 110, the second measurement value MB of the bootloader 120, and/or the third measurement value MA of the attester FW 130. For example, the attester FW 130 may transmit the first measurement value MR, the second measurement value MB, and/or the third measurement value MA to the host 200 as one measurement value response Measurement.

The measurement manager 140 according to some example embodiments may perform a measurement operation for the device identification module 110, the bootloader 120, and/or the attester FW 130. In addition, the measurement manager 140 according to some example embodiments may perform a measurement operation for the plurality of pieces of firmware 150_1, 150_2, . . . , 150_$n$ in the device 100.

The measurement manager 140 according to some example embodiments may store the first measurement value MR when it is determined that the first measurement value MR of the device identification module 110 matches preset (or alternately given) first information. For example, the measurement manager 140 may measure the first measurement value MR of the device identification module 110, and when the measured first measurement value MR matches the preset (or alternately given) first information, the measurement manager 140 may store the first measurement value MR to the first register SMR #0. The preset (or alternately given) first information according to some example embodiments may be a measurement reference value of the device identification module 110 previously set by a manufacturer.

According to some example embodiments, when it is determined that the second measurement value MB of the bootloader 120 matches preset (or alternately given) second information, the measurement manager 140 may store the second measurement value MB. When the first measurement value MR is stored, the measurement manager 140 according to some example embodiments may store the second measurement value MB. When the first measurement value MR is stored, the measurement manager 140 according to some example embodiments may be requested to perform a measurement operation for the bootloader 120 and may perform the measurement operation. For example, the measurement manager 140 may measure the second measurement value MB of the bootloader 120, and when the measured second measurement value MB matches the preset (or alternately given) second information, the measurement manager 140 may store the second measurement value MB in the second register SMR #1. The preset (or alternately given) second information according to some example embodiments may be a measurement reference value of the bootloader 120 previously set by a manufacturer.

According to some example embodiments, when it is determined that the third measurement value MA of the attester FW 130 matches preset (or alternately given) third information, the measurement manager 140 may store the third measurement value MA. When the second measurement value MB is stored, the measurement manager 140 according to some example embodiments may store the third measurement value MA. When the second measurement value MB is stored, the measurement manager 140 according to some example embodiments may be requested to perform a measurement operation for the attester FW 130 and may perform the measurement operation. For example, the measurement manager 140 measures the third measurement value MA of the attester FW 130, and when the measured third measurement value MA matches the preset (or alternately given) third information, the measurement manager 140 may store the third measurement value MA in the third register SMR #2. The preset (or alternately given) third information according to some example embodiments may be a measurement reference value of the attester FW 130 previously set by a manufacturer.

Figure 3A:
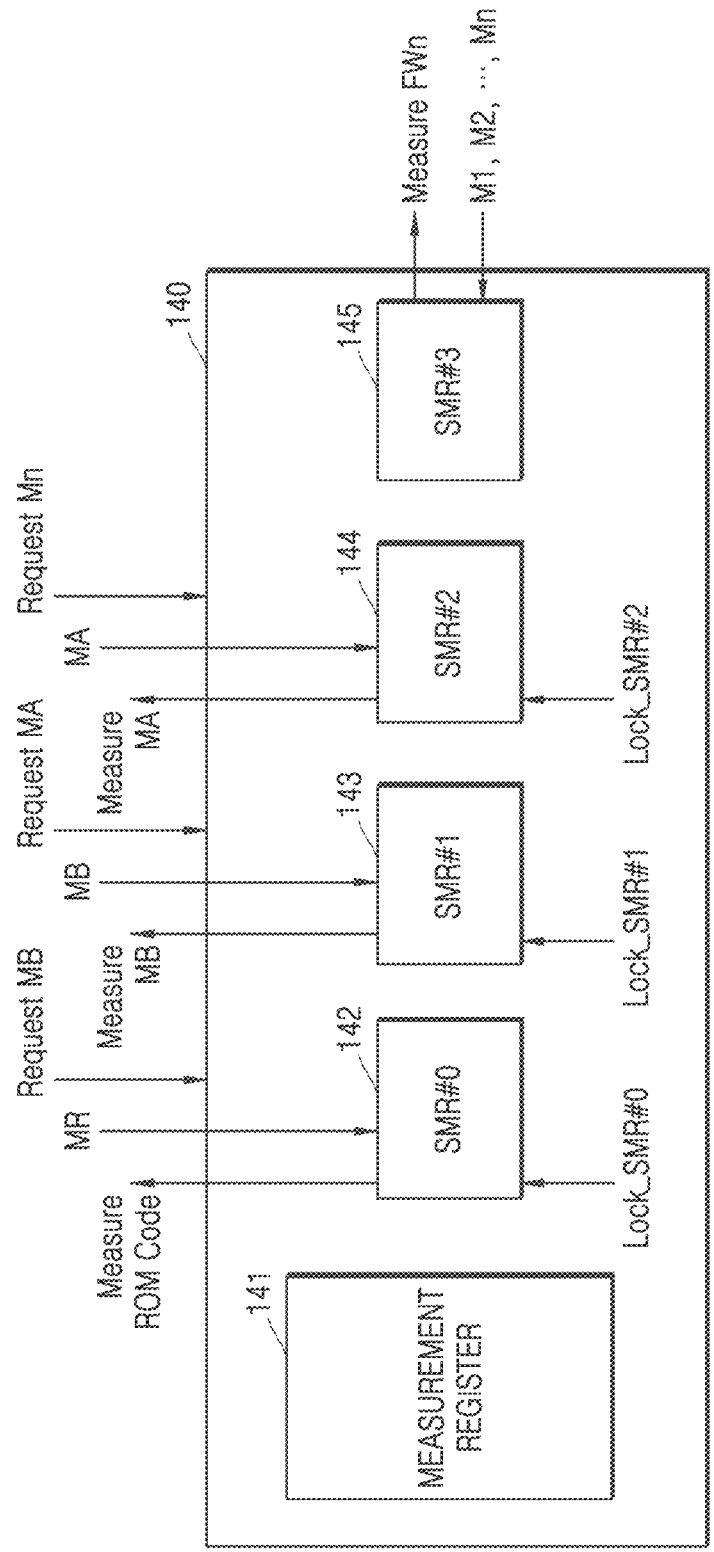
FIGS. 3A and 3B are block diagrams of a measurement manager of a storage device according to some example embodiments.
Figure 3B:
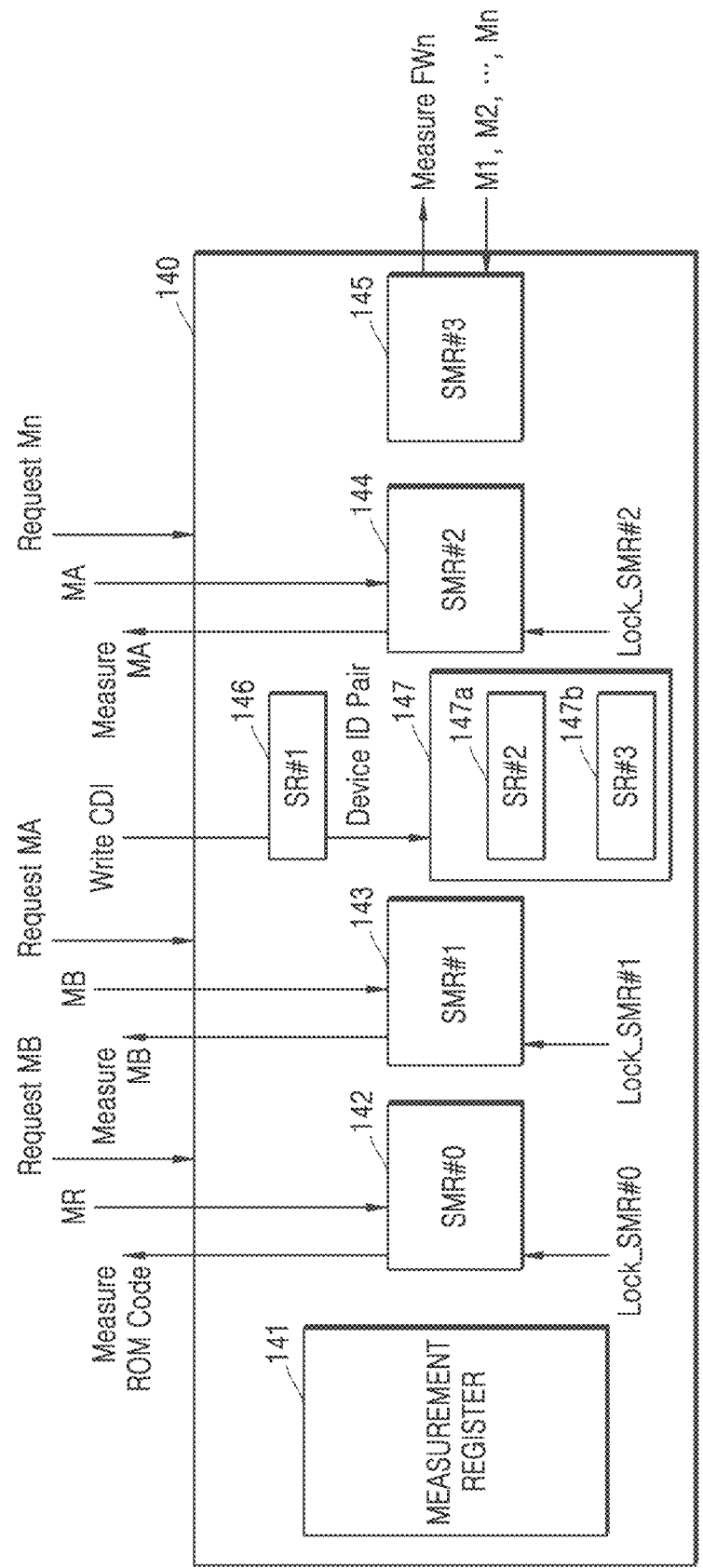

FIGS. 3A and 3B are block diagrams of the measurement manager 140 of a storage device according to some example embodiments.

Referring to FIG. 3A, the measurement manager 140 according to some example embodiments may include a plurality of registers. For example, the measurement manager 140 may include a measurement value register 141, a first register 142, a second register 143, a third register 144, and/or a fourth register 145. The number of registers is not limited thereto and the measurement manager 140 may further include a plurality of registers.

The measurement value register 141 according to some example embodiments may store previously set device information and information related to an operation of the measurement manager 140 according to the device information. For example, the measurement value register 141 may store first information that is a reference of measurement values of the device identification module 110, second information that is a reference of measurement values of the bootloader 120, and/or third information that is a reference of measurement values of the attester FW 130. In addition, the measurement value register 141 according to some example embodiments may store fourth information that is measurement information on the plurality of pieces of firmware 150_1, 150_2, . . . , 150_n.

When the measurement value matches the previously stored information, the measurement value register 141 according to some example embodiments may store information for requesting a write prohibition operation to the first register 142 to the fourth register 145. For example, when the first information matches a first measurement value, the measurement manager 140 may prohibit writing to the first register 142. When the second information matches a second measurement value, the measurement manager 140 may prohibit writing to the second register 143. When the third information matches a third measurement value, the measurement manager 140 may prohibit writing to the third register 144.

The first register 142 according to some example embodiments may request a measurement operation for the first measurement value and store the first measurement value. For example, the first register 142 may transmit the request for measuring the ROM code Measure ROM Code to the device identification module 110 and receive the first measurement value MR. When receiving the first measurement value MR, the measurement manager 140 according to some example embodiments may compare the first measurement value MR with the first information. When it is determined that the first measurement value MR matches the first information, the measurement manager 140 according to some example embodiments may store the received first measurement value MR. When the first measurement value MR is stored, the measurement manager 140 according to some example embodiments may prohibit a write operation for the first register 142. For example, the first register 142 may receive a write prohibition request Lock_SMR #0 to the first register 142 and prohibit data write.

The second register 143 according to some example embodiments may request a measurement operation for the second measurement value and store the second measurement value. For example, the second register 143 may transmit the measurement request Measure MB for a bootloader to the bootloader 120 and receive the second measurement value MB. When receiving the second measurement value MB, the measurement manager 140 according to some example embodiments may compare the second measurement value MB with the second information. When it is determined that the second measurement value MB matches the second information, the measurement manager 140 according to some example embodiments may store the received second measurement value MB. When the second measurement value MB is stored, the measurement manager 140 according to some example embodiments may prohibit a write operation for the second register 143. For example, the second register 143 may receive a write prohibition request Lock_SMR #1 to the second register 143 and prohibit data write.

The third register 144 according to some example embodiments may request a measurement operation for the third measurement value and store the third measurement value. For example, the third register 144 may transmit a measurement request Measure MA for an attester FW to the attester FW 130 and receive the third measurement value MA. When receiving the third measurement value MA, the measurement manager 140 according to some example embodiments may compare the third measurement value MA with the third information. When it is determined that the third measurement value MA matches the third information, the measurement manager 140 according to some example embodiments may store the received third measurement value MA. When the third measurement value MA is stored, the measurement manager 140 according to some example embodiments may prohibit a write operation for the third register 144. For example, the third register 144 may receive a write prohibition request Lock_SMR #2 to the third register 143 and prohibit data write.

The fourth register 145 according to some example embodiments may request a measurement operation for a plurality of pieces of firmware and store measurement values M1, M2, . . . , Mn of the plurality of pieces of firmware. For example, the fourth register 145 may transmit a measurement request Measure FWn for a plurality of pieces of firmware to the plurality of pieces of firmware 150_1, 150_2, . . . , 150_n, and receive the measurement values M1, M2, . . . , Mn of the plurality of pieces of firmware. When receiving the measurement values M1, M2, . . . , Mn of the plurality of pieces of firmware, the measurement manager 140 according to some example embodiments may compare the measurement values M1, M2, . . . , Mn of the plurality of pieces of firmware with information on a plurality of pieces of preset (or alternately given) firmware. When it is determined that the measurement values M1, M2, . . . , Mn of the plurality of pieces of firmware match the information on the plurality of pieces of preset (or alternately given) firmware, the measurement manager 140 according to some example embodiments may store the received measurement values M1, M2, . . . , Mn of the plurality of pieces of firmware. There may be a plurality of pieces of firmware according to some example embodiments depending on functions of the device 100, and the number of pieces of firmware may be n.

Referring to FIG. 3B, the measurement manager 140 according to some example embodiments may include a plurality of security registers. For example, the measurement manager 140 may include the measurement value register 141, the first register 142, the second register 143, the third register 144, and/or the fourth register 145 and may include a first security register 146 and/or a security register 147. The security register 147 may include a second security register 147a, and/or a third security register 147b.

The first security register 146 according to some example embodiments may store a device identifier CDI. The device identifier CDI according to some example embodiments may be generated based on the second measurement value MB. For example, when the first measurement value MR matches the first information match and the first measurement value MR is stored in the first register 142, the measurement manager 140 may determine that the device identification module 110 is not tampered with and drive the bootloader 120. In order to drive the bootloader 120, the measurement manager 140 according to some example embodiments may measure the second measurement value MB. When the second measurement value MB is measured and the second register 143 receives the second measurement value MB, the device identifier CDI according to some example embodiments may be generated. When the device identifier CDI is generated, the first security register 146 of the measurement manager 140 according to some example embodiments may receive a device identifier write request Write_CDI and store the generated device identifier CDI.

The second security register 147a and the third security register 147b according to some example embodiments may each store a device identification key pair. The device identification key pair according to some example embodiments may include either a device ID key pair or an alias key pair.

The second security register 147a according to some example embodiments may store the device ID key pair. For example, the second security register 147a may store a device ID security key (SK) and/or a device ID public key (PK).

The third security register 147b according to some example embodiments may store the alias key pair. For example, the third security register 147b may store an alias security key Alias SK and/or an alias public key Alias PK.

The measurement manager 140 according to some example embodiments may receive a first security signature generated from the device SK of the device ID key pair. For example, the attester FW 130 may generate the first security signature, which is a basis for generating a device certificate, based on the device SK. When the first security signature is generated, the measurement manager 140 according to some example embodiments may receive the first security signature from the attester FW 130. The measurement manager 140 according to some example embodiments some example embodiments may receive a second security signature generated from the alias security key Alias SK of the alias key pair. For example, the attester FW 130 may generate the second security signature, which is a basis for generating a device certificate, based on the alias security key Alias SK. When the second security signature is generated, the measurement manager 140 according to some example embodiments may receive the second security signature from the attester FW 130.

Figure 3C:
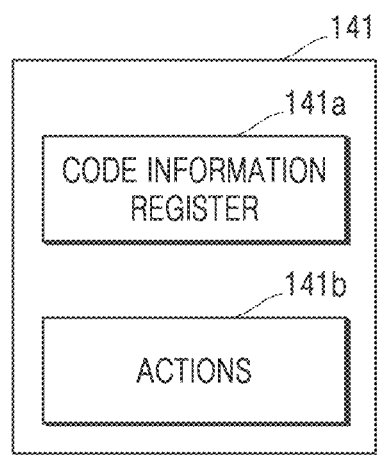
FIG. 3C is a block diagram illustrating a measurement register of a measurement manager of a storage device according to some example embodiments.

FIG. 3C is a block diagram illustrating the measurement value register 141 of the measurement manager 140 of a storage device according to some example embodiments.

Referring to FIG. 3C, the measurement value register 141 according to some example embodiments may include a code information register 141a and an action register 141b.

The code information register 141a according to some example embodiments may store information on a measurement value of a device configuration. For example, the code information register 141a may store first information that is a reference of measurement values of the device identification module 110, second information that is a reference of measurement values of the bootloader 120, and/or third information that is a reference of measurement values of the attester FW 130. In addition, the code information register 141a according to some example embodiments may store fourth information that is measurement information on the plurality of pieces of firmware 150_1, 150_2, . . . , 150_n.

The action register 141b according to some example some example embodiments s may store operation information of the measurement manager 140 according to a measurement result. For example, when the measurement value matches the previously stored information, the action register 141b may store information requesting a write prohibition operation to the first register 142 to the fourth register 145. For example, when the first information matches a first measurement value, the measurement manager 140 may prohibit writing to the first register 142 based on the information stored in the action register 141*b*. When the second information matches a second measurement value, the measurement manager 140 may prohibit writing to the second register 143 based on the information stored in the action register 141*b*. When the third information matches a third measurement value, the measurement manager 140 may prohibit writing to the third register 144 based on the information stored in the action register 141*b*.

In addition, the measurement manager 140 described with reference to FIGS. 2 to 3C may be configured with a processor inside or outside the device 100. For example, the measurement manager 140 may be configured by the controller 160.

Figure 4:
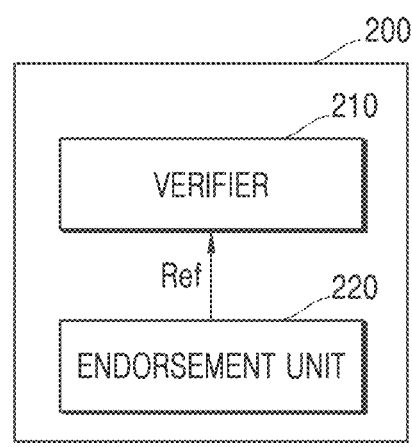
FIG. 4 is a block diagram of a host according to some example embodiments.

FIG. 4 is a block diagram of the host 200 according to some example embodiments.

Referring to FIG. 4, the host 200 according to some example embodiments may include a verifier 210 and an endorsement unit 220. The verifier 210 and/or the endorsement unit 220 may be implemented by the controller 260. However, example embodiments are not limited thereto.

The verifier 210 according to some example embodiments may receive the measurement value response Measurement from the device 100 and determine whether the device 100 is tampered with by comparing the received measurement value response Measurement with a preset (or alternately given) reference Ref. For example, the verifier 210 may read the preset (or alternately given) reference Ref from the endorsement unit 220 and compare the measurement value response Measurement received from the device 100 with the preset (or alternately given) reference Ref. The preset (or alternately given) reference Ref according to some example embodiments may be a measurement value input by a manufacturer. The measurement value response Measurement according to some example embodiments may include the first measurement value MR, the second measurement value MB, the third measurement value MA, and/or the measurement values M1, M2, . . . , Mn of the plurality of pieces of firmware. In addition, the preset (or alternately given) reference Ref according to some example embodiments may include a reference value for the first measurement value MR, a reference value for the second measurement value MB, a reference value for the third measurement value MA, and/or the measurement values M1, M2, . . . , Mn of the plurality of pieces of firmware.

The verifier 210 according to some example embodiments may compare the preset (or alternately given) reference value of the device identification module 110 with the first measurement value MR, and when it is determined that the preset (or alternately given) reference value of the device identification module 110 is different from the measurement value MR as a result of the comparison, the device identification module 110 may be determined to be tampered with. The reference value of the device identification module 110 according to some example embodiments may be input by a manufacturer of the device 100.

The verifier 210 according to some example embodiments may compare the preset (or alternately given) reference value of the bootloader 120 with the second measurement value MB, and when it is determined that the preset (or alternately given) reference value of the bootloader 120 is different from the second measurement value MB as a result of the comparison, the bootloader 120 may be determined to be tampered with. The preset (or alternately given) reference value of the bootloader 120 according to some example embodiments may be input by a manufacturer of the device 100.

The verifier 210 according to some example embodiments may compare the preset (or alternately given) reference value of the attester FW 130 with the third measurement value MA, and when it is determined that the preset (or alternately given) reference value of the attester FW 130 is different from the third measurement value MA as a result of the comparison, the attester FW 130 may be determined to be tampered with. The preset (or alternately given) reference value of the attester FW 130 according to some example embodiments may be input by a manufacturer of the device 100.

The verifier 210 according to some example embodiments may compare the preset (or alternately given) measurement values of the plurality of pieces of firmware with the measurement values M1, M2, . . . , Mn of the plurality of pieces of firmware received from the attester FW 130, and when it is determined that the preset (or alternately given) measurement values of the plurality of pieces of firmware are different from the measurement values M1, M2, . . . , Mn of the plurality of pieces of firmware received from the attester FW 130 as a result of the comparison, at least one of the plurality of pieces of firmware **150_1, 150_2, . . . , 150_*n* may be determined to be tampered with. According to some example embodiments, the preset (or alternately given) measurement values of the plurality of pieces of firmware 150_1, 150_2, . . . , 150_*n* may be input by a manufacturer of the device 100**.

The endorsement unit 220 according to some example embodiments may store preset (or alternately given) reference values Ref for the plurality of measurement values. The preset (or alternately given) reference values Ref according to some example embodiments may be reference values for determining whether the device 100 is tampered with. For example, in order to compare the measurement value response Measurement received from the attester FW 130 with the preset (or alternately given) reference value Ref, a manufacturer may store the preset (or alternately given) reference value Ref in the endorsement unit 220. The preset (or alternately given) reference value Ref according to some example embodiments may include a reference value for a first measurement value, a reference value for a second measurement value, a reference value for a third measurement value, and a reference value for measurement values of a plurality of pieces of firmware.

Figure 5:
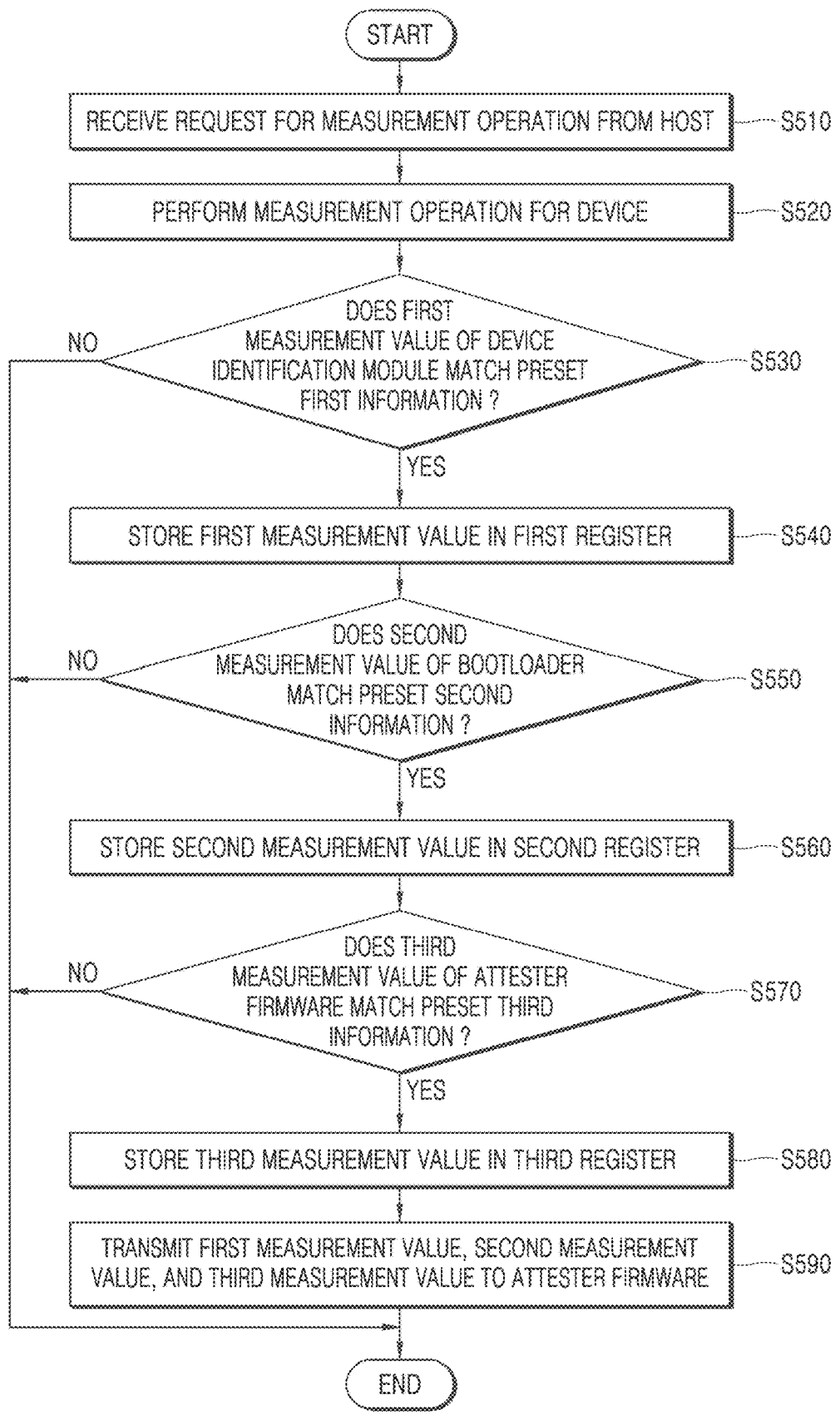
FIG. 5 is a flowchart of an operating method of a storage device, according to some example embodiments.

FIG. 5 is a flowchart of an operating method of a storage device, according to some example embodiments.

Referring to FIG. 5, the device 100 according to some example embodiments may receive a measurement operation request from the host 200 (S510). For example, the device 100 may receive the measurement value generation request signal GET_Measurement from the host 200.

When receiving the measurement operation request from the host 200, the device 100 according to some example embodiments may perform a measurement operation (S520). For example, the device 100 may perform a measurement operation through the measurement manager 140.

When the measurement operation is performed, the device 100 according to some example embodiments may determine whether the first measurement value MR of the device identification module 110 matches the preset (or alternately given) first information (S530). The preset (or alternately given) first information according to some example embodiments may be a measurement reference value of the device identification module 110 previously set by a manufacturer.

When it is determined that the first measurement value matches the preset (or alternately given) first information, the device 100 according to some example embodiments may store the first measurement value MR in the first register 142 (S540). When it is determined that the first measurement value MR of the device identification module 110 matches the preset (or alternately given) first information, the device 100 according to some example embodiments may store the first measurement value MR. For example, the device 100 may measure the first measurement value MR of the device identification module 110, and when the measured first measurement value MR matches the preset (or alternately given) first information, the device 100 may store the first measurement value MR in the first register 142.

However, when it is determined that the first measurement value MR does not match the preset (or alternately given) first information, the device 100 according to some example embodiments may determine that the measurement operation is failed and end the measurement operation.

When the first measurement value MR is stored in the first register 142, the device 100 according to some example embodiments may determine whether the second measurement value MB of the bootloader 120 matches the preset (or alternately given) second information S550. The preset (or alternately given) second information according to some example embodiments may be a measurement reference value of the bootloader 120 previously set by a manufacturer.

When it is determined that the second measurement value MB matches the preset (or alternately given) second information, the device 100 according to some example embodiments may store the second measurement value MB in the second register 143 (S560). When it is determined that the second measurement value MB of the bootloader 120 matches the preset (or alternately given) second information, the device 100 according to some example embodiments may store the second measurement value MB. For example, the device 100 may measure the second measurement value MB of the bootloader 120, and when the measured second measurement value MB matches the preset (or alternately given) second information, the device 100 may store the second measurement value MB in the second register 143.

However, when it is determined that the second measurement value MB does not match the preset (or alternately given) second information, the device 100 according to some example embodiments may determine that the measurement operation is failed and end the measurement operation.

When the second measurement value MB is stored in the second register 143, the device 100 according to some example embodiments may determine whether the third measurement value MA of the attester FW 130 matches the preset (or alternately given) third information (S570). The preset (or alternately given) third information according to some example embodiments may be a measurement reference value of the attester FW 130 previously set by a manufacturer.

When it is determined that the third measurement value MA matches the preset (or alternately given) third information, the device 100 according to some example embodiments may store the third measurement value MA in the third register 144 (S580). When it is determined that the third measurement value MA of the attester FW 130 matches the preset (or alternately given) third information, the device 100 according to some example embodiments may store the third measurement value MA. For example, the device 100 may measure the third measurement value MA of the attester FW 130, and when the measured third measurement value MA matches the preset (or alternately given) third information, the device 100 may store the third measurement value MA in the third register 144.

However, when it is determined that the third measurement value MA does not match the preset (or alternately given) third information, the device 100 according to some example embodiments may determine that the measurement operation is failed and end the measurement operation.

When all of the first measurement value MR, the second measurement value MB, and the third measurement value MA are stored, the device 100 according to some example embodiments may transmit the first measurement value MR, the second measurement value MB, and/or the third measurement value MA to the attester FW 130 (S590). The attester FW 130 according to some example embodiments may generate the measurement value response Measurement based on the first measurement value MR, the second measurement value MB, and/or the third measurement value MA.

Figure 6:
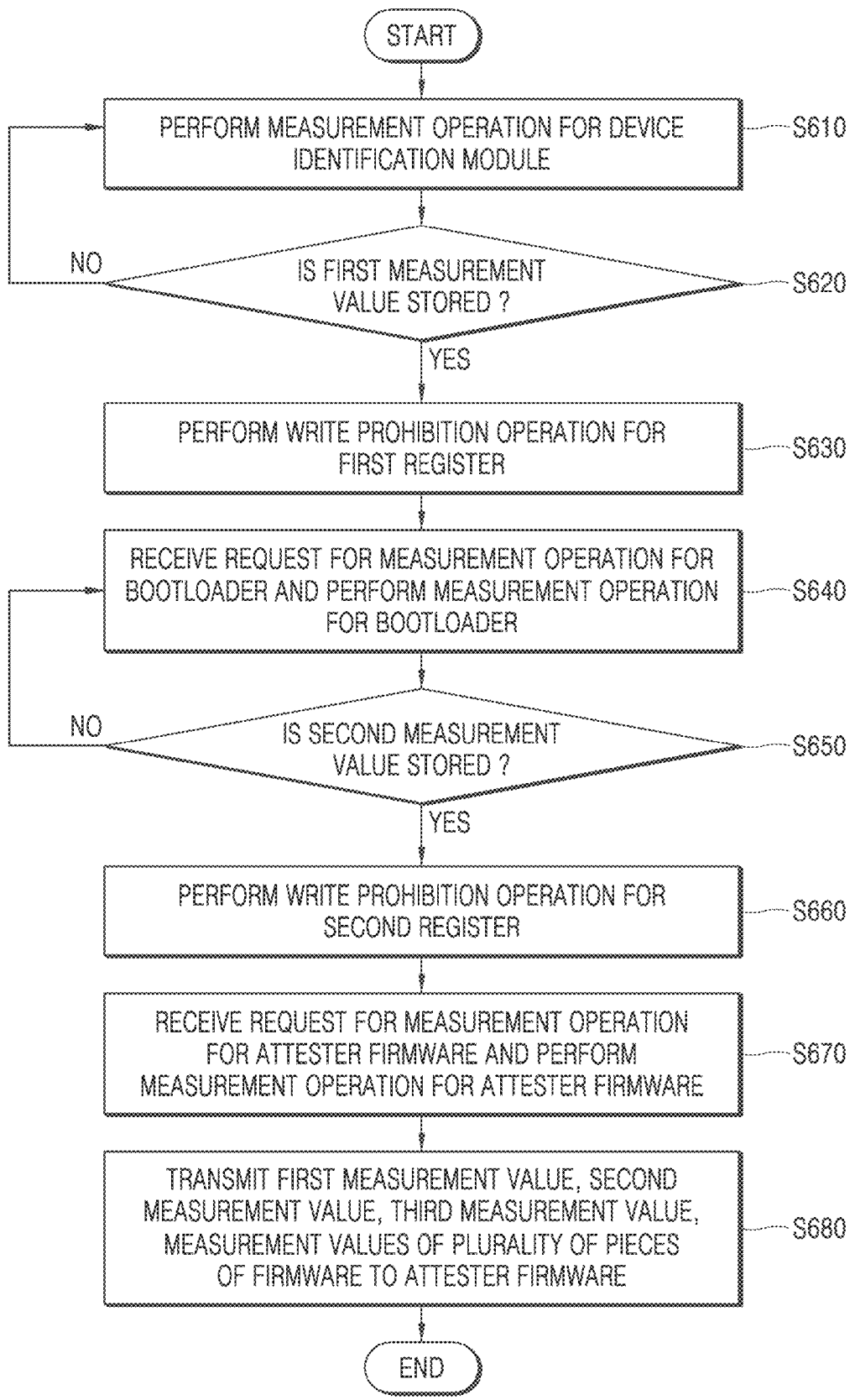
FIG. 6 is a flowchart illustrating a process of transmitting first to third measurement values to attester firmware in an operating method of a storage device, according to some example embodiments.

FIG. 6 is a flowchart illustrating a process of transmitting first to third measurement values to an attester FW in an operating method of a storage device, according to some example embodiments.

Referring to FIG. 6, the device 100 according to some example embodiments may perform a measurement operation for the device identification module 110 (S610). For example, in order to perform secure booting, the device identification module 110 may receive the ROM code measurement request Measure ROM Code and measure a ROM code. The device identification module 110 according to some example embodiments may transmit the measured ROM code to the measurement manager 140 as the first measurement value MR.

When a measurement operation for the device identification module 110 is performed, the device 100 according to some example embodiments may determine whether the first measurement value MR is stored (S620). When it is determined that the first measurement value MR of the device identification module 110 matches the preset (or alternately given) first information, the device 100 according to some example embodiments may store the first measurement value MR. For example, the device 100 may measure the first measurement value MR of the device identification module 110, and when the measured first measurement value MR matches the preset (or alternately given) first information, the device 100 may store the first measurement value MR in the first register 142. The preset (or alternately given) first information according to some example embodiments may be a measurement reference value of the device identification module 110 previously set by a manufacturer.

When it is determined that the first measurement value MR is stored, the device 100 according to some example embodiments may perform a write prohibition operation for the first register 142 (S630). For example, when the first information matches the first measurement value MR, the measurement manager 140 may prohibit writing to the first register 142. The first register 142 according to some example embodiments may receive the write prohibition request Lock_SMR #0 to the first register 142 and prohibit data write.

However, when it is determined that the first measurement value MR is not stored, the device 100 according to some example embodiments may perform a measurement operation for the device identification module 110 again.

When the write prohibition operation for the first register 142 is performed, the device 100 according to some example embodiments may perform a measurement operation for the bootloader 120 (S640). For example, in order to perform secure booting, the bootloader 120 may receive a second measurement value MB and perform a measurement operation. The bootloader 120 according to some example embodiments may transmit the measured value of the bootloader 120 to the measurement manager 140 as the second measurement value MB.

When the measurement operation of the bootloader 120 is performed, the device 100 according to some example embodiments may determine whether the second measurement value MB is stored (S650). When it is determined that the second measurement value MB of the bootloader 120 matches the preset (or alternately given) second information, the device 100 according to some example embodiments may store the second measurement value MB. For example, the device 100 may measure the second measurement value MR of the bootloader 120, and when the measured second measurement value MB matches the preset (or alternately given) second information, the device 100 may store the second measurement value MR in the second register 143. The preset (or alternately given) second information according to some example embodiments may be a measurement reference value of the bootloader 120 previously set by a manufacturer.

When it is determined that the second measurement value MB is stored, the device 100 according to some example embodiments may perform a write prohibition operation for the second register 143 (S660). For example, when the second information matches the second measurement value, the device 100 may prohibit writing to the second register 143. According to some example embodiments, the second register 143 may receive the write prohibition request Lock_SMR #1 to the second register 143 and prohibit data write.

However, when it is determined that the second measurement value MB is not stored, the device 100 according to some example embodiments may perform a measurement operation for the bootloader 120 again.

When a write prohibition operation for the second register 143 is performed, the device 100 according to some example embodiments may receive a measurement operation request for the attester FW 130, and perform a measurement operation for the attester FW 130 (S670).

For example, in order to perform secure booting, the attester FW 130 may receive the measurement request Measure MA for the third measurement value MA and perform a measurement operation. The attester FW 130 according to some example embodiments may transmit a measured value of the attester FW 130 to the measurement manager 140 as the third measurement value MA. The device 100 according to some example embodiments may also perform a measurement operation for the plurality of pieces of firmware 150_1, 150_2, . . . , 150_n. The device 100 according to some example embodiments may receive a measurement operation request for the plurality of pieces of firmware and store the measurement value M1, M2, . . . , Mn of the plurality of pieces of firmware.

When all of the first measurement value MR, the second measurement value MB, and the third measurement value MA are stored, the device 100 according to some example embodiments may transmit the first measurement value MR, the second measurement value MB, the third measurement value MA, and/or the measurement values M1, M2, . . . , Mn) of the plurality of pieces of firmware to the attester FW 130 (S680). The attester FW 130 according to some example embodiments may generate measurement value responses Measurement based on the first measurement value MR, the second measurement value MB, the third measurement value MA, and measurement values M1, M2, . . . , Mn.

Figure 7:
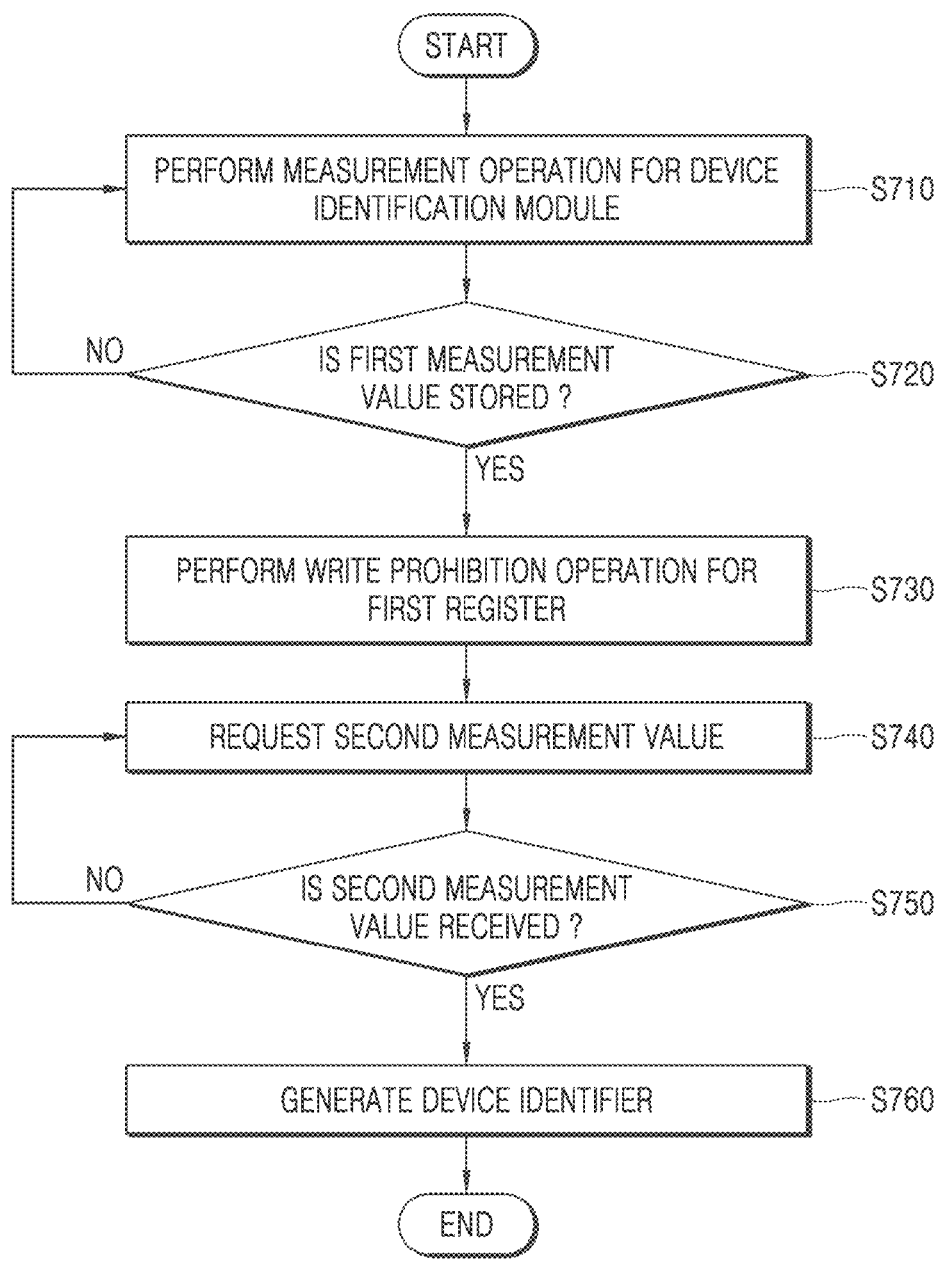
FIG. 7 is a flowchart illustrating a process of generating a device identifier in an operating method of a storage device, according to some example embodiments.

FIG. 7 is a flowchart illustrating a process of generating the device identifier CDI in an operating method of a storage device, according to some example embodiments.

Referring to FIG. 7, the device 100 according to some example embodiments may perform a measurement operation for the device identification module 110 (S710). For example, in order to perform secure booting, the device identification module 110 may receive a ROM code measurement request Measure ROM Code and measure a ROM code. The device identification module 110 according to some example embodiments may transmit the measured ROM code to the measurement manager 140 as the first measurement value MR.

When it is determined that a measurement operation for the device identification module 110 is performed, the device 100 according to some example embodiments may determine whether the first measurement value MR is stored (S720). When it is determined that the first measurement value MR of the device identification module 110 matches the preset (or alternately given) first information, the device 100 according to some example embodiments may store the first measurement value MR. For example, the device 100 may measure the first measurement value MR of the device identification module 110, and when the measured first measurement value MR matches the preset (or alternately given) first information, the device 100 may store the first measurement value MR in the first register 142. The preset (or alternately given) first information according to some example embodiments may be a measurement reference value of the device identification module 110 previously set by a manufacturer.

When it is determined that the first measurement value MR is stored, the device 100 according to some example embodiments may perform a write prohibition operation for the first register 142 (S730). For example, when the first information matches the first measurement value MR, the measurement manager 140 may prohibit writing to the first register 142. According to some example embodiments, the first register 142 may receive the write prohibition request Lock_SMR #0 to the first register 142 and prohibit data write.

However, when it is determined that the first measurement value MR is not stored, the device 100 according to some example embodiments may perform a measurement operation for the device identification module 110 again.

When the write prohibition operation for the first register 142 is performed, the device 100 according to some example embodiments may request the second measurement value MB (S740). For example, in order to perform secure booting, the bootloader 120 may receive a measurement request Measure MB for a second measurement value and perform a measurement operation. The bootloader 120 according to some example embodiments may transmit a measured value of the bootloader 120 to the measurement manager 140 as the second measurement value MB.

When receiving a request for the second measurement value MB, the device 100 according to some example embodiments may determine whether the second measurement value MB is received (S750).

The device 100 according to some example embodiments may receive the second measurement value MB of the bootloader 120. For example, the device 100 may receive the second measurement value MB of the bootloader 120, and when the received second measurement value MB matches the preset (or alternatively given) second information, the device 100 may store the second measurement value MB to the second register 143. The preset (or alternately given) second information according to some example embodiments may be a measurement reference value of the bootloader 120 previously set by a manufacturer.

When it is determined that the second measurement value MB is received, the device 100 according to some example embodiments may generate the device identifier CDI (S760). The device identification module 110 according to some example embodiments may generate the device identifier CDI and transmit the generated device identifier CDI to the bootloader 120.

Figure 8:
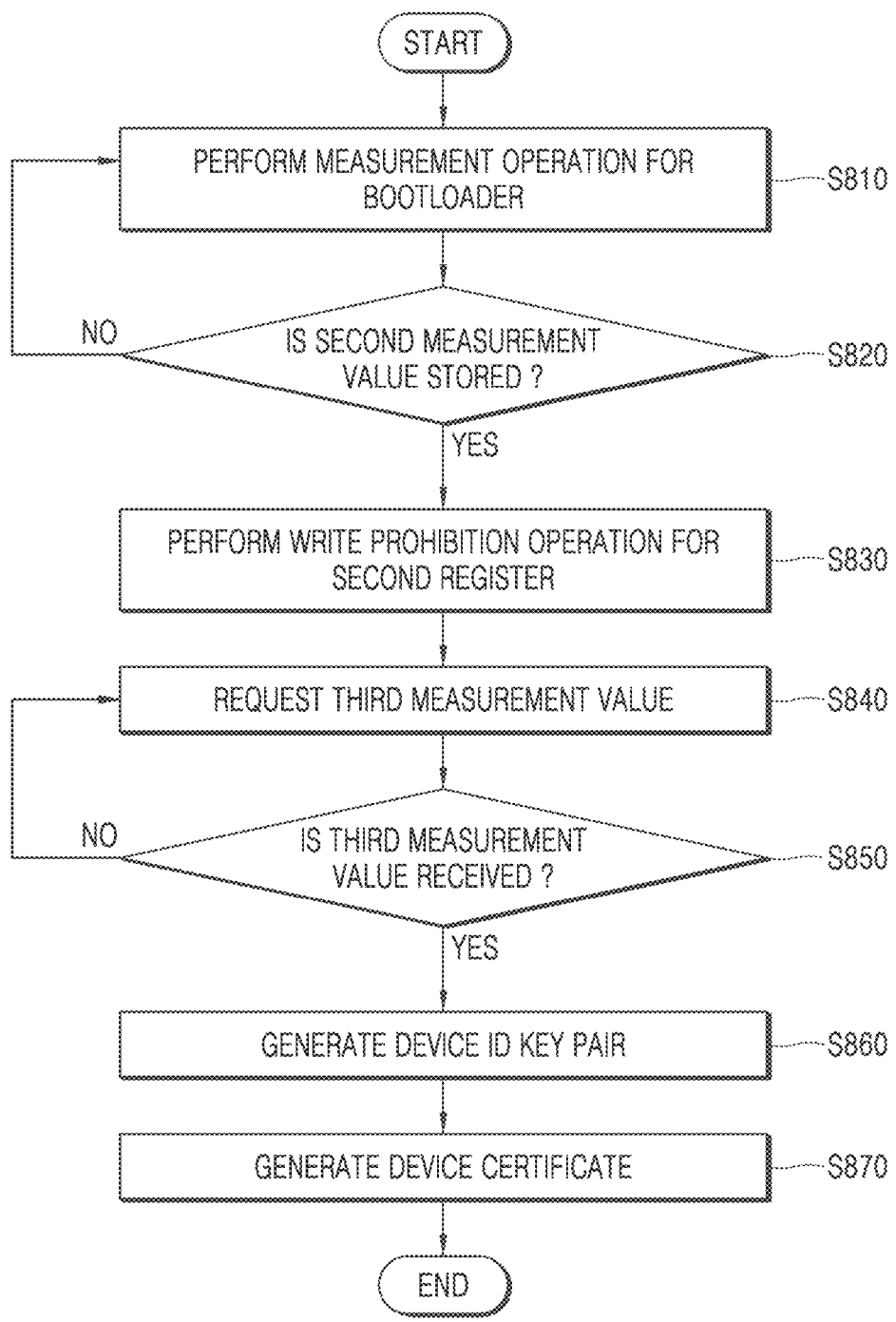
FIG. 8 is a flowchart illustrating a process of generating a device certificate in an operating method of a storage device, according to some example embodiments.

FIG. 8 is a flowchart illustrating a process of generating a device certificate in an operating method of a storage device, according to some example embodiments.

Referring to FIG. 8, the device 100 according to some example embodiments may perform a measurement operation for the bootloader 120 (S810). For example, in order to perform secure booting, the bootloader 120 may receive the measurement request Measure MB for the second measurement value and measure the second measurement value MB. The bootloader 120 according to some example embodiments may transmit the measured value to the measurement manager 140 as the second measurement value MB.

When it is determined that a measurement operation for the bootloader 120 is performed, the device 100 according to some example embodiments may determine whether the second measurement value MB is stored (S820). When it is determined that the second measurement value MB of the bootloader 120 matches the preset (or alternately given) second information, the device 100 according to some example embodiments may store the second measurement value MB. For example, the device 100 may measure the second measurement value MB of the bootloader 120, and when the measured second measurement value MB matches the preset (or alternately given) second information, the device 100 may store the second measurement value MB in the second register 143. The preset (or alternately given) second information according to some example embodiments may be a measurement reference value of the bootloader 120 previously set by a manufacturer.

When it is determined that the second measurement value MB is stored, the device 100 according to some example embodiments may perform a write prohibition operation for the second register 143 (S830). For example, when the second information matches the second measurement value MB, the device 100 may prohibit writing to the second register 143. According to some example embodiments, the second register 143 may receive the write prohibition request Lock_SMR #1 to the second register 143 and prohibit data write.

However, when it is determined that the second measurement value MB is not stored, the device 100 according to some example embodiments may perform a measurement operation for the bootloader 120 again.

When the write prohibition operation for the second register 143 is performed, the device 100 according to some example embodiments may request the third measurement value MA (S840). For example, in order to perform secure booting, the attester FW 130 may receive a measurement request Measure MA for a third measurement value and perform a measurement operation. The attester FW 130 according to some example embodiments some example embodiments may transmit a measured value of the attester FW 130 to the measurement manager 140 as the third measurement value MA.

When a request for the third measurement value MA is received, the device 100 according to some example embodiments may determine whether the third measurement value MA is received (S850).

The device 100 according to some example embodiments may receive the third measurement value MA of the attester FW 130. For example, the device 100 may receive the third measurement value MA of the attester FW 130, and when the received third measurement value MA matches the preset (or alternately given) third information, the device 100 may store the third measurement value MA in the third register 144. The preset (or alternately given) third information according to some example embodiments may be a measurement reference value of the attester FW 130 previously set by a manufacturer.

When it is determined that the third measurement value MA is received, the device 100 according to some example embodiments may generate the Device identification Key pair (S860). The device identification key pair according to some example embodiments may include the alias key pair. The device identification key pair according to some example embodiments may include a device ID security key (SK) and/or a device ID public key (PK). The alias key pair according to some example embodiments may include an alias SK and/or an alias PK.

When the device identification key pair is generated, the device 100 according to some example embodiments may generate a device certificate (S870). The device certificate according to some example embodiments may be information proving that the device 100 is not modified. The host 200 according to some example embodiments may verify the device 100 based on the device certificate.

The device certificate according to some example embodiments may be signed with a security signature. The device 100 according to some example embodiments may generate a first security signature generated from the device SK of the device ID key pair. For example, the attester FW 130 may generate the first security signature, which is a basis for generating the device certificate, based on the device SK. When the first security signature is generated, the measurement manager 140 according to some example embodiments may receive the first security signature from the attester FW 130.

The measurement manager 140 according to some example embodiments may receive a second security signature generated from an alias SK of an alias key pair. For example, the attester FW 130 may generate the second security signature, which is a basis for generating a device certificate, based on the alias SK. When the second security signature is generated, the measurement manager 140 according to some example embodiments may receive the second security signature from the attester FW 130.

Figure 9:
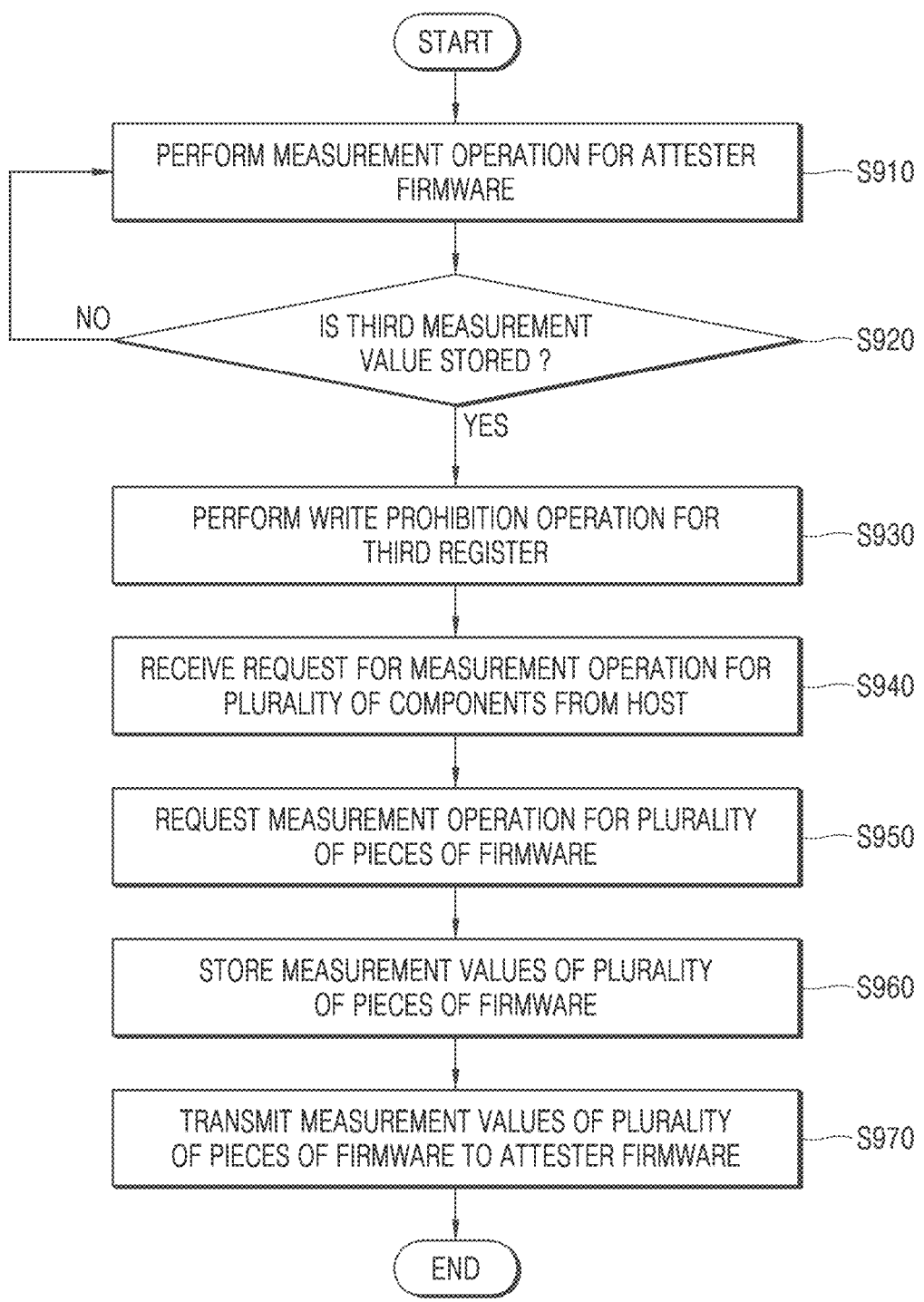
FIG. 9 is a flowchart illustrating a measurement operation of a plurality of pieces of firmware in an operating method of a storage device, according to some example embodiments.

FIG. 9 is a flowchart illustrating a measurement operation for a plurality of pieces of firmware in an operating method of a storage device, according to some example embodiments.

Referring to FIG. 9, the device 100 according to some example embodiments may perform a measurement operation for the attester FW 130 (S910). For example, in order to perform secure booting, the attester FW 130 may receive the measurement request Measure MA for a third measurement value and measure the third measurement value MA. The attester FW 130 according to some example embodiments may transmit the measured value to the measurement manager 140 as the third measurement value MA.

When it is determined that a measurement operation for the attester FW 130 is performed, the device 100 according to some example embodiments may determine whether the third measurement value MA is stored (S920). When it is determined that the third measurement value MA of the attester FW 130 matches the preset (or alternately given) third information, the device 100 according to some example embodiments may store the third measurement value MA. For example, the device 100 may measure the third measurement value MA of the attester FW 130, and when the measured third measurement value MA matches the preset (or alternately given) third information, the device 100 may store the third measurement value MA in the third register 144. The preset (or alternately given) third information according to some example embodiments may be a measurement reference value of the attester FW 130 previously set by a manufacturer.

When it is determined that the third measurement value MA is stored, the device 100 according to some example embodiments may perform a write prohibition operation for the third register 144 (S930). For example, when the third information and matches the third measurement value MA, the device 100 may prohibit writing to the third register 144. According to some example embodiments, the third register 144 may receive the write prohibition request Lock_SMR #2 to the third register 144 and prohibit data write.

However, when it is determined that the third measurement value MA is not stored, the device 100 according to some example embodiments may perform a measurement operation for the attester FW 130 again.

When the write prohibition operation for the third register 144 is performed, the device 100 according to some example embodiments may receive a measurement operation request for a plurality of components from the host 200 (S940). For example, the host 200 may request a measurement operation for the plurality of pieces of firmware 150_1, 150_2, . . . , 150_n included in the device 100. The plurality of pieces of firmware according to some example embodiments may be plural depending on functions of the device 100, and the number of pieces of firmware may be n.

When receiving a measurement operation request for the plurality of components from the host 200, the device 100 according to some example embodiments may request a measurement operation for the plurality of pieces of firmware 150_1, 150_2, . . . , 150_n (S950).

The fourth register 145 according to some example embodiments may request the measurement operation for the plurality of pieces of firmware and store the measurement values M1, M2, . . . , Mn for the plurality of pieces of firmware. For example, the fourth register 145 may transmit a measurement request (Measure FWn for the plurality of pieces of firmware to the plurality of pieces of firmware 150_1, 150_2, . . . , 150_n, and receive the measurement values M1, M2, . . . , Mn of the plurality of pieces of firmware.

When receiving a measurement operation request for the plurality of pieces of firmware 150_1, 150_2, . . . , 150_n, the device 100 according to some example embodiments may store the measurement values M1, M2, . . . , Mn of the plurality of pieces of firmware 150_1, 150_2, . . . , 150_n (S960).

When receiving the measurement values M1, M2, . . . , Mn of the plurality of pieces of firmware, the measurement manager 140 according to some example embodiments may compare the measurement values M1, M2, . . . , Mn of the plurality of pieces of firmware with preset (or alternately given) information on the plurality of pieces of firmware. When it is determined that the measurement values M1, M2, . . . , Mn of the plurality of pieces of firmware match the preset (or alternately given) information on the plurality of pieces of firmware, the measurement manager 140 according to some example embodiments may store the received measurement values M1, M2, . . . , Mn of the plurality of pieces of firmware.

When the measurement values M1, M2, . . . , Mn of the plurality of pieces of firmware 150_1, 150_2, . . . , 150_n are stored, the device 100 according to some example embodiments may transmit the measurement values M1, M2, . . . , Mn of the plurality of pieces of firmware 150_1, 150_2, . . . , 150_n to the attester FW 130 (S970). The measurement value response Measurement according to some example embodiments may include the first measurement value MR, the second measurement value MB, the third measurement value MA, and/or the measurement values M1, M2, . . . , Mn.

Figure 10:
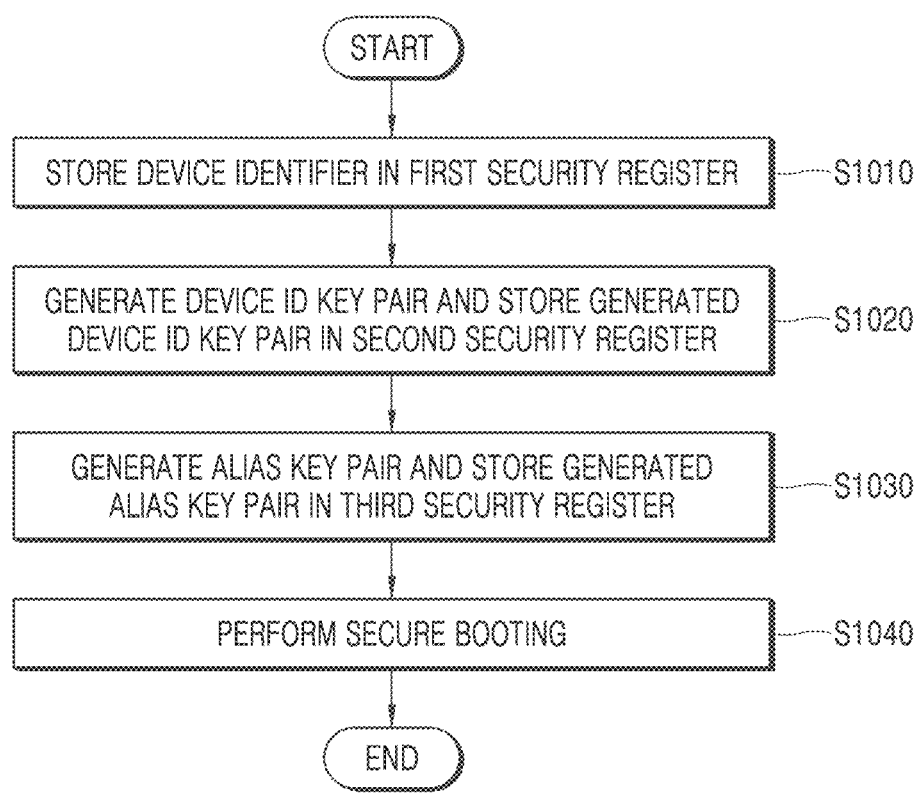
FIG. 10 illustrates a process of performing secure booting by utilizing a security register in an operating method of a storage device, according to some example embodiments.

FIG. 10 illustrates a process of performing secure booting by using a security register in an operating method of a storage device, according to some example embodiments.

Referring to FIG. 10, the device 100 according to some example embodiments may store the device identifier CDI in the first security register 146 (S1010). The first security register 146 according to some example embodiments may receive a device identifier write request Write_CDI and store the generated device identifier CDI.

When the device identifier CDI is stored in the first security register 146, the device 100 according to some example embodiments may generate a device ID key pair and store the generated device ID key pair in the second security register 147a (S1020). The second security register 147a according to some example embodiments may store a device ID key pair. For example, the second security register 147a may store a device ID SK and/or a device ID PK. The device identification key pair according to some example embodiments may include either a device ID key pair or an alias key pair.

In addition, the device 100 according to some example embodiments may generate the alias key pair and store the generated alias key pair in the third security register 147b (S1030). For example, the third security register 147b may store the alias SK and an alias PK.

When storing of the first security register 146, the second security register 147a, and the third security register 147b is completed, the device 100 according to some example embodiments may perform secure booting (S1040).

Figure 11:
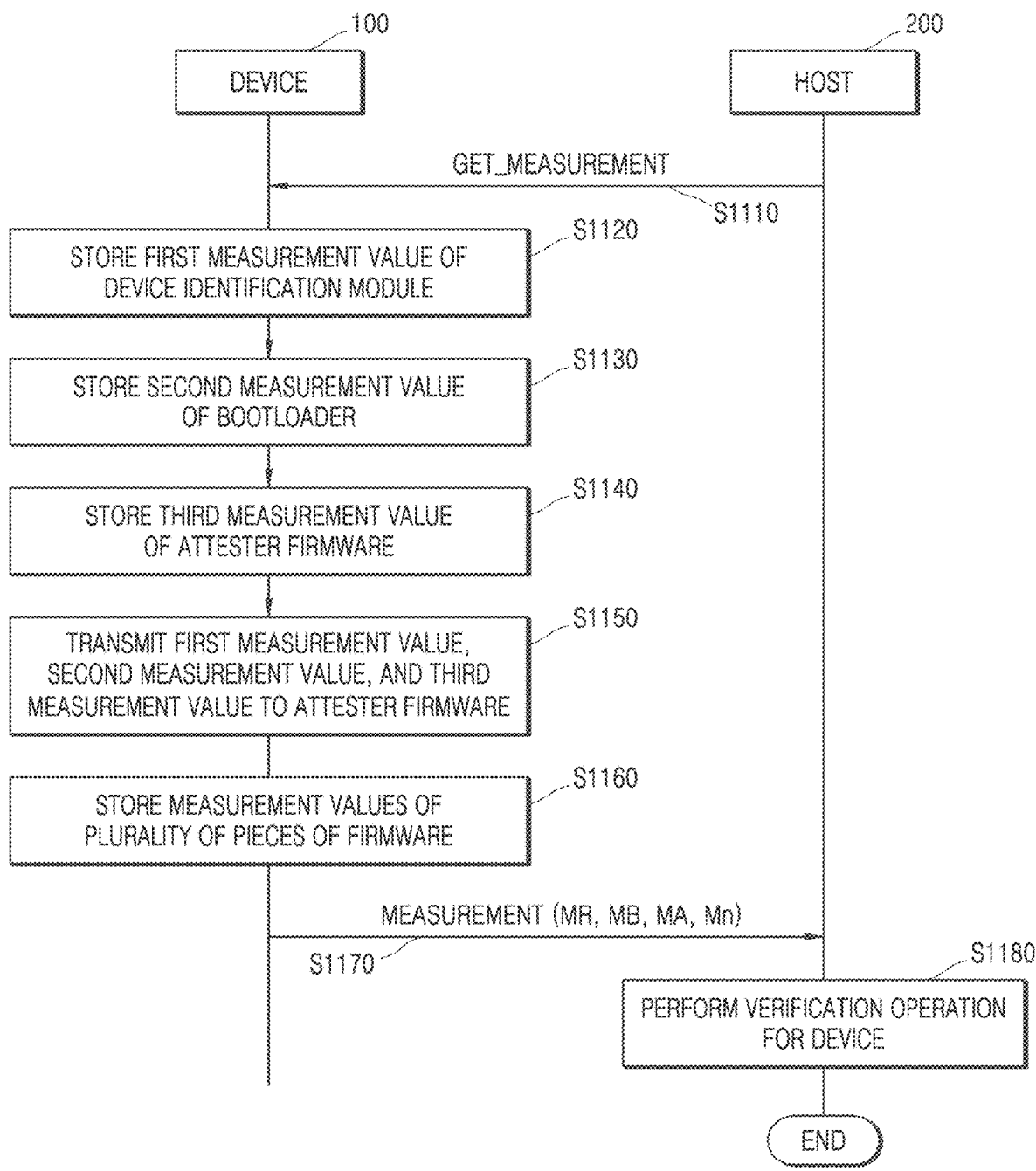
FIG. 11 is a flowchart illustrating an operating method of a storage device, according to some example embodiments.

FIG. 11 is a flowchart illustrating an operating method of a storage device, according to some example embodiments.

Referring to FIG. 11, the host 200 may transmit the measurement value generation request signal (Remeasurement) to the device 100 (S1110).

When receiving the measurement value generation request signal GET_Measurement, the device 100 according to some example embodiments may store the first measurement value MR of the device identification module 110 (S1120).

When it is determined that the first measurement value matches the preset (or alternately given) first information, the device 100 according to some example embodiments may store the first measurement value MR in the first register 142 (S540). When it is determined that the first measurement value MR of the device identification module 110 matches the preset (or alternately given) first information, the device 100 according to some example embodiments may store the first measurement value MR. For example, the device 100 may measure the first measurement value MR of the device identification module 110, and when the measured first measurement value MR matches the preset (or alternately given) first information, the device 100 may store the first measurement value MR in the first register 142. The preset (or alternately given) first information according to some example embodiments may be a measurement reference value of the device identification module 110 previously set by a manufacturer.

When the first measurement value MR of the device identification module 110 is stored, the device 100 according to some example embodiments may store the second measurement value MB of the bootloader 120 (S1140).

When it is determined that the second measurement value MB matches the preset (or alternately given) second information, the device 100 according to some example embodiments may store the second measurement value MB in the second register 143 (S560). When it is determined that the second measurement value MB of the bootloader 120 matches the preset (or alternately given) second information, the device 100 according to some example embodiments may store the second measurement value MB. For example, the device 100 may measure the second measurement value MB of the bootloader 120, and when the measured second measurement value MB matches the preset (or alternately given) second information, the device 100 may store the second measurement value MB in the second register 143. The preset (or alternately given) second information according to some example embodiments may be a measurement reference value of the bootloader 120 previously set by a manufacturer.

When the second measurement value MB of the bootloader 120 is stored, the device 100 according to some example embodiments may store the third measurement value MA of the attester FW 130 (S1150).

When it is determined that the third measurement value matches the preset (or alternately given) third information, the device 100 according to some example embodiments some example embodiments may store the third measurement value MA in the third register 144 (S580). When it is determined that the third measurement value MA of the attester FW 130 matches the preset (or alternately given) third information, the device 100 according to some example embodiments may store the third measurement value MA. For example, the device 100 may measure the third measurement value MA of the attester FW 130, and when the measured third measurement value MA matches the preset (or alternately given) third information, the device 100 may store the third measurement value MA in the third register 144. The preset (or alternately given) third information according to some example embodiments may be a measurement reference value of the attester FW 130 previously set by a manufacturer.

When the first measurement value MR, the second measurement value MB, and the third measurement value MA are stored, the device 100 according to some example embodiments may transmit the first measurement value MR, the second measurement value MB, and the third measurement value MA to the attester FW 130 (S1150). The attester FW 130 according to some example embodiments may generate the measurement value response Measurement based on the first measurement value MR, the second measurement value MB, and/or the third measurement value MA.

In addition, the device 100 according to some example embodiments may store the measurement values M1, M2, . . . , Mn of the plurality of pieces of firmware 150_1, 150_2, . . . , 150_n (S1160). The measurement values M1, M2, . . . , Mn of the plurality of pieces of firmware 150_1, 150_2, . . . , 150_n may be stored in the fourth register 145. The fourth register 145 according to some example embodiments may request a measurement operation for a plurality of pieces of firmware and store the measurement values M1, M2, . . . , Mn of the plurality of pieces of firmware 150_1, 150_2, . . . , 150_n. For example, the fourth register 145 may transmit the firmware measurement request Measure FWn to the plurality of pieces of firmware and receive the measurement values M1, M2, . . . , Mn of the plurality of pieces of firmware 150_1, 150_2, . . . , 150_n. When the measurement values M1, M2, . . . , Mn of the plurality of pieces of firmware 150_1, 150_2, . . . , 150_n are stored, the measurement value response Measurement may include the first measurement value MR, the second measurement values MB, the third measurement value MA, and the measurement values M1, M2, . . . , Mn of the plurality of pieces of firmware 150_1, 150_2, . . . , 150_n.

When the first measurement value MR, the second measurement value MB, the third measurement value MA, and the measurement values M1, M2, . . . , Mn of the plurality of pieces of firmware 150_1, 150_2, . . . , 150_n are stored, the device 100 according to a some example embodiments may transmit the measurement value response Measurement to the host 200 (S1170). The measurement value response Measurement according to some example embodiments may include the first measurement value MR, the second measurement value MB, the third measurement value MA, and/or the measurement values M1, M2, . . . , Mn.

When the measurement value response Measurement is transmitted to the host 200, the host 200 according to some example embodiments may perform a verification operation for the device 100 (S1180).

The host 200 according to some example embodiments may compare a preset (or alternately given) reference value of the device identification module 110 with the first measurement value MR, and when it is determined that the preset (or alternately given) reference value of the device identification module 110 is different from the first measurement value MR as a result of the comparison, the host 200 may determine that the device identification module 110 is tampered with. The preset (or alternately given) reference value of the device identification module 110 according to some example embodiments may be a value input by a manufacturer of the device 100.

The host 200 according to some example embodiments may compare a preset (or alternately given) reference value of the bootloader 120 with the second measurement value MB, and when it is determined that the preset (or alternately given) reference value of the bootloader 120 is different from the second measurement value MB as a result of the comparison, the host 200 may determine that the bootloader 120 is tampered with. The preset (or alternately given) reference value of the bootloader 120 according to some example embodiments may be a value input by a manufacturer of the device 100.

The host 200 according to some example embodiments may compare a preset (or alternately given) reference value of the attester FW 130 with the third measurement value MA, and when it is determined that the preset (or alternately given) reference value of the attester FW 130 is different from the third measurement value MA as a result of the comparison, the host 200 may determine that the attester FW 130 is tampered with. The preset (or alternately given)

reference value of the attester FW 130 according to some example embodiments may be a value input by a manufacturer of the device 100.

The host 200 according to some example embodiments may compare preset (or alternately given) measurement values of the plurality of preset (or alternately given) firmware 150_1, 150_2, . . . , 150_n with the measurement values M1, M2, . . . , Mn of the plurality of pieces of firmware 150_1, 150_2, . . . , 150_n received from the attester FW 130, and when it is determined that the preset (or alternately given) measurement values of the plurality of pieces of firmware 150_1, 150_2, . . . , 150_n are different from the measurement values M1, M2, . . . , Mn of the plurality of pieces of firmware 150_1, 150_2, . . . , 150_n received from the attester FW 130 as a result of the comparison, the host 200 may determine that one of the plurality of pieces of firmware 150_1, 150_2, . . . , 150_n is tampered with. The preset (or alternately given) measurement values of the plurality of pieces of firmware 150_1, 150_2, . . . , 150_n may be values input by a manufacturer of the device 100.

One or more of the elements disclosed above may include or be implemented in one or more processing circuitries such as hardware including logic circuits; a hardware/software combination such as a processor executing software; or a combination thereof. For example, the processing circuitries more specifically may include, but is not limited to, a central processing unit (CPU), an arithmetic logic unit (ALU), a digital signal processor, a microcomputer, a field programmable gate array (FPGA), a System-on-Chip (SoC), a programmable logic unit, a microprocessor, application-specific integrated circuit (ASIC), etc.

While the inventive concepts have been particularly shown and described with reference to some example embodiments thereof, it will be understood that various changes in form and details may be made therein without departing from the spirit and scope of the following claims.

What is claimed is:

1. A storage device comprising:
a device identification module configured to generate a device identifier;
a bootloader configured to generate a device identification key pair based on the device identifier and perform booting of the storage device;
attester firmware configured to
generate a device certificate based on the device identification key pair, and
report security information on the storage device to a host; and
a measurement manager configured to
perform a measurement operation for the device identification module, the bootloader, and the attester firmware,
store a first measurement value of the device identification module in response to determining that the first measurement value matches first information,
determine whether a second measurement value of the bootloader matches second information in response to storing the first measurement value,
store the second measurement value in response to determining that the second measurement value matches the second information,
determine whether a third measurement value of the attester firmware matches third information in response to the second measurement value being stored,
store the third measurement value in response to determining that the third measurement value matches the third information, and
transmit the stored first measurement value, the stored second measurement value, and the stored third measurement value to the attester firmware.

2. The storage device of claim 1, further comprising:
a first register configured to store the first measurement value;
a second register configured to store the second measurement value; and
a third register configured to store the third measurement value.

3. The storage device of claim 2, wherein the measurement manager is configured to prohibit a write operation for the first register in response to the first measurement value being stored in the first register, and
the device identification module is configured to
request the second measurement value from the measurement manager, and
generate the device identifier in response to receiving the second measurement value.

4. The storage device of claim 2, wherein the measurement manager is configured to prohibit a write operation for the second register in response to the second measurement value being stored in the second register, and
the bootloader is configured to
request the third measurement value from the measurement manager, and
generate the device identification key pair based on the generated device identifier in response to receiving the third measurement value.

5. The storage device of claim 2, wherein the measurement manager is configured to prohibit a write operation for the third register in response to the third measurement value being stored in the third register, and
the attester firmware is configured to
receive a request for measurement operations for a plurality of components from the host, and
request the measurement manager to perform measurement operations for a plurality of pieces of firmware based on the request from the host.

6. The storage device of claim 1, wherein the device identification key pair includes at least one of a device ID key pair or an alias key pair.

7. The storage device of claim 6, further comprising:
a first security register configured to store the device identifier;
a second security register configured to store the device ID key pair generated based on the device identifier; and
a third security register configured to store the alias key pair generated based on the device identifier.

8. The storage device of claim 7, wherein
the measurement manager is configured to
receive a first security signature generated by the attester firmware from a device security key of the device ID key pair and a second security signature generated by the attester firmware from an alias security key of the alias key pair, and
transmit the received first security signature and the received second security signature to the attester firmware.

9. The storage device of claim 1, further comprising:
a fourth register configured to store measurement values of a plurality of pieces of firmware, wherein the measurement manager is further configured to transmit the measurement values stored in the fourth register to the attester firmware.

10. The storage device of claim 1, wherein
the security information includes at least one of the first measurement value, the second measurement value, the third measurement value, or a fourth measurement value,
the attester firmware is further configured to transmit a measurement value response including the security information to the host, and
the host is configured to perform verification of the storage device based on the measurement value response.

11. An operating method of a storage device, the operating method comprising:
performing measurement of a plurality of components according to a request from a host for a measurement operation for the plurality of components of the storage device;
performing secure booting based on a result of the measurement of the plurality of components;
storing a first measurement value of a device identification module in a first register in response to determining that the first measurement value matches first information;
determining whether a second measurement value of a bootloader matches second information in response to the first measurement value being stored;
storing the second measurement value in a second register in response to determining that the second measurement value matches the second information;
determining whether a third measurement value of attester firmware matches third information in response to the second measurement value being stored;
storing the third measurement value in a third register in response to determining that the third measurement value matches the third information;
transmitting the first information, the second information, and the third information, to an attester firmware; and
reporting the first information, the second information, and the third information to the host.

12. The operating method of claim 11, wherein the performing the measurement of the plurality of components includes,
performing a write prohibition operation for the first register in response to the first measurement value being stored in the first register, and
generating a device identifier based on the second measurement value.

13. The operating method of claim 11, wherein the performing the measurement of the plurality of components comprises:
performing a write prohibition operation for the second register in response to the second measurement value being stored in the second register; and
generating a device identification key pair based on a device identifier.

14. The operating method of claim 11, wherein the performing the measurement of the plurality of components comprises:
performing a write prohibition operation for the third register in response to the third measurement value being stored in the third register;
receiving a request for a measurement operation for the plurality of components from the host; and
performing a measurement operation for a plurality of pieces of firmware based on the request from the host.

15. The operating method of claim 11, wherein the performing the measurement of the plurality of components comprises:
storing a device identifier in a first security register;
storing a device ID key pair generated based on the device identifier in a second security register; and
storing an alias key pair generated based on the device identifier in a third security register.

16. The operating method of claim 15, wherein the performing the measurement of the plurality of components comprises:
receiving a first security signature generated from a device security key of the device ID key pair and a second security signature generated from an alias security key of the alias key pair; and
transmitting the received first security signature and the received second security signature to the attester firmware.

17. The operating method of claim 11, wherein the performing the measurement of the plurality of components comprises:
storing measurement values for a plurality of pieces of firmware in a fourth register; and
transmitting the measurement values stored in the fourth register to the attester firmware.

18. The operating method of claim 11, wherein the reporting the first information, the second information, and the third information to the host comprises:
transmitting a measurement value response including the first measurement value, the second measurement value, the third measurement value, and a fourth measurement value to the host.

19. The operating method of claim 18, further comprising:
performing, by the host, verification of the storage device based on the measurement value response.

20. A processor of a storage device configured to receive a request for a measurement operation for a plurality of components of the storage device from a host and perform the measurement operation for the plurality of components, the processor comprising:
a first register;
a second register; and
a third register,
the processor configured to
store a first measurement value of a device identification module in the first register in response to determining that the first measurement value matches first information;
determine whether a second measurement value of a bootloader matches second information in response to the first measurement value being stored,
store the second measurement value in response to determining that the second measurement value matches second information,
determine whether a third measurement value of attester firmware matches third information in response to the second measurement value being stored,
store the third measurement value in the third register in response to determining that the third measurement value matches the third information, and
transmit the first information, the second information, and the third information to the attester firmware.

* * * * *